United States Patent
Furuzawa et al.

(10) Patent No.: US 9,849,847 B2
(45) Date of Patent: Dec. 26, 2017

(54) CONNECTOR COVER STRUCTURE FOR CASING HOUSING A HIGH-VOLTAGE COMPONENT

(71) Applicant: TOYOTA JIDOSHA KABUSHIKI KAISHA, Toyota-shi, Aichi-ken (JP)

(72) Inventors: Akiyoshi Furuzawa, Toyota (JP); Koji Katano, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/932,624

(22) Filed: Nov. 4, 2015

(65) Prior Publication Data

US 2016/0134046 A1    May 12, 2016

(30) Foreign Application Priority Data

Nov. 12, 2014 (JP) .................................. 2014-230185

(51) Int. Cl.
*H01R 13/453* (2006.01)
*B60R 16/023* (2006.01)

(52) U.S. Cl.
CPC ....... *B60R 16/0239* (2013.01); *H01R 13/453* (2013.01); *H01R 13/4532* (2013.01); *H01R 13/4534* (2013.01); *H01R 13/4536* (2013.01)

(58) Field of Classification Search
CPC .............. H01R 13/4536; H01R 13/453; H01R 13/4532; H01R 13/4534; H01R 13/447
USPC ................ 439/135, 136, 142, 331, 521, 892
See application file for complete search history.

(56) References Cited

U.S. PATENT DOCUMENTS

| 6,213,808 B1* | 4/2001 | Whatmore | H01R 13/516 439/417 |
|---|---|---|---|
| 2005/0266740 A1* | 12/2005 | Kikuchi | H01R 4/44 439/801 |
| 2011/0003227 A1 | 1/2011 | Matsubara | |
| 2012/0244730 A1* | 9/2012 | Grimm | H01R 13/447 439/142 |

(Continued)

FOREIGN PATENT DOCUMENTS

| JP | 2006-014577 A | 1/2006 |
|---|---|---|
| JP | 2011-159396 A | 8/2011 |
| JP | 2012-148673 A | 8/2012 |

(Continued)

*Primary Examiner* — Abdullah Riyami
*Assistant Examiner* — Justin Kratt
(74) *Attorney, Agent, or Firm* — Finnegan, Henderson, Farabow, Garrett & Dunner, LLP

(57) ABSTRACT

Provided is a connector cover structure that can fasten a connector cover without support for the connector cover with a finger and showing a high degree of assembly of a cover member in fabrication. The connector cover structure covers connects 61 and 62 for passage of high-voltage current provided in a casing 51 housing a high-voltage component in a vehicle 10. The connector cover structure includes connector covers 71 and 72 each having a flat surface along a vertical direction, first anchoring parts 91 and second anchoring parts 74 provided in the connector covers 71 and 72, fastening holes 92 formed in the connector covers 71 and 72 and configured to fasten the connector covers 71 and 72 to the casing 51, and float preventing mechanisms 95 for pressing the surfaces of the connector covers 71 and 72.

2 Claims, 6 Drawing Sheets

(56) References Cited

U.S. PATENT DOCUMENTS

2013/0008903 A1\* 1/2013 Sakamoto ............ H05K 7/1432
    220/255
2014/0127920 A1\* 5/2014 Tanaka ................. H01R 13/713
    439/135

FOREIGN PATENT DOCUMENTS

| | | |
|---|---|---|
| JP | 2014-87153 | 5/2014 |
| KR | 20-0408484 Y | 2/2006 |
| KR | 20-2010-0006424 U | 6/2010 |
| WO | WO2007/088664 A1 | 8/2007 |
| WO | WO2012/070140 A1 | 5/2012 |
| WO | WO2013/046997 A1 | 4/2013 |

\* cited by examiner

CONNECTOR COVER STRUCTURE FOR CASING HOUSING A HIGH-VOLTAGE COMPONENT

BACKGROUND OF THE INVENTION

Field of the Invention

The present invention relates to a connector cover structure that is provided in a casing housing a high-voltage component in a vehicle and that covers a connector for passage of high-voltage current.

Background Art

A fuel cell stack is a power generation system that directly converts energy released in oxidation reaction into electric energy by oxidizing fuel with an electrochemical process. The fuel cell stack includes a film-electrode assembly in which side surfaces of a polyelectrolyte film for selectively transporting hydrogen ions are held between a pair of electrodes of a porous material. Each of the pair of electrodes contains carbon powder loaded with a platinum-based metal catalyst as a main component and includes a catalyst layer in contact with the polyelectrolyte film and a gas diffusion layer formed on a surface of the catalyst layer and having air permeability and electronic conductivity.

A fuel cell vehicle carrying a fuel cell system as a power source runs by driving a traction motor with electricity generated by a fuel cell stack. Recent fuel cell vehicles have attracted attention as an electric power plant that can externally supply electric power. Some fuel cell vehicles include external power supply units for supplying electric power generated by fuel cell stacks to external devices. Examples of known external power supply units include a unit including an inverter circuit.

As a technique concerning a vehicle including an external power supply unit, a power supply device that can supply electric power stored in a battery to an external electric device and a vehicle including the power supply device are disclosed (see Patent Document 1).

CITATION LIST

Patent Document

[Patent Document 1] JP2014-87153 A

SUMMARY OF THE INVENTION

Such a power supply device as disclosed in Patent Document 1 includes a casing that houses a high-voltage component, and the casing includes a connector for passage of high-voltage current. The connector receives and outputs high-voltage current, and thus, the casing needs to include a connector cover that covers the connector. However, in fastening the connector cover to the casing, the connector cover needs to be supported by fingers in order to prevent the connector cover from falling down. Consequently, the connector cover is poorly assembled in fabrication.

The present invention has been made in view of the foregoing circumstances, and an object of the present invention is to provide a connector cover that can fasten the connector cover without support for the connector cover with a finger and enables a cover member to be suitably assembled in fabrication.

To achieve the object described above, a connector cover according to the present invention includes: a first anchoring part and a second anchoring part for anchoring a connector cover to the casing; a fastening structure into which a fastening member for fastening the connector cover to the casing is inserted; and a float preventing mechanism for pressing a surface of the connector cover.

Preferably, the first anchoring part is a positioning-member insertion hole into which a positioning member of the connector cover is inserted, and the second anchoring part is a fastening-member concealing member covering a fastening member for fixing the connector cover to the casing.

The float preventing mechanism is preferably an extension to be engaged with a part of a striker fixing bracket for fixing a striker.

In the connector cover according to the present invention, rotation around one of the first anchoring part or the second anchoring part can be reduced by the other anchoring part. In addition, the float preventing mechanism can reduce rotation of the connector cover in the pressing direction around one of the first anchoring part or the second anchoring part. Thus, connector cover can be fastened without support for the connector cover with a finger, and the connector cover shows a high degree of assembly of the connector cover in fabrication.

DESCRIPTION OF THE PREFERRED EMBODIMENTS

Figure 1:
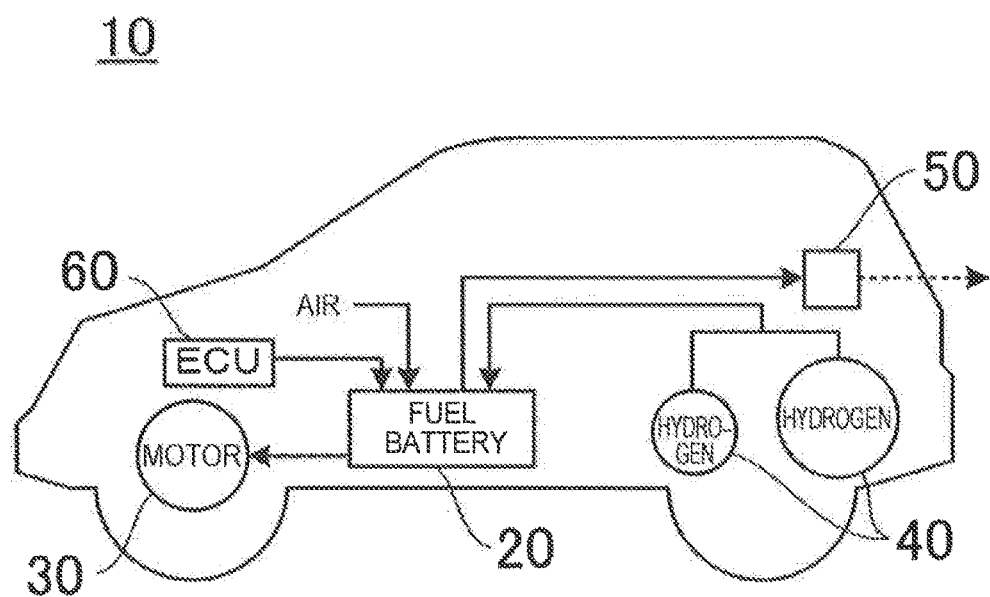
FIG. 1 schematically illustrates an fuel cell vehicle carrying the external power supply unit.

An embodiment of the present invention will be described. In the drawings, same or like reference characters are used to designate identical or equivalent elements. The drawings are schematic illustrations. Thus, specific dimensions, for example, may be considered in view of the following description. The drawings, of course, may include portions with different size relationships and proportions.

Referring to FIG. 1, a fuel cell vehicle carrying an external power supply unit including a connector cover structure according to an embodiment of the present invention will be described. FIG. 1 schematically illustrates the fuel cell vehicle carrying the external power supply unit. As illustrated in FIG. 1, the fuel cell vehicle 10 runs by driving a traction motor 30 with electricity generated by a fuel cell 20. The fuel cell 20 receives hydrogen as a fuel gas from a high-pressure hydrogen tank 40 and also receives air.

The fuel cell 20 is composed of a stack structure of a plurality of cells (hereinafter referred to as a fuel cell stack). For example, the cell of a solid polymer electrolyte fuel cell includes, at least, an ion permeable electrolyte film, a membrane electrode assembly (MEA) composed of an anode-side catalyst layer (electrode layer) and a cathode-side catalyst layer (electrode layer) that hold the electrolyte film therebetween, and a gas diffusion layer for supplying a fuel gas or an oxidant gas to the membrane electrode assembly. The cell is held between a pair of separators.

The fuel cell vehicle 10 includes an external power supply unit 50 for supplying electric power to an external device. The external power supply unit 50 includes, for example, an inverter circuit and is electrically connected to the fuel cell stack 20. The fuel cell stack 20 is controlled by an electronic control unit (ECU) 60.

Figure 2:
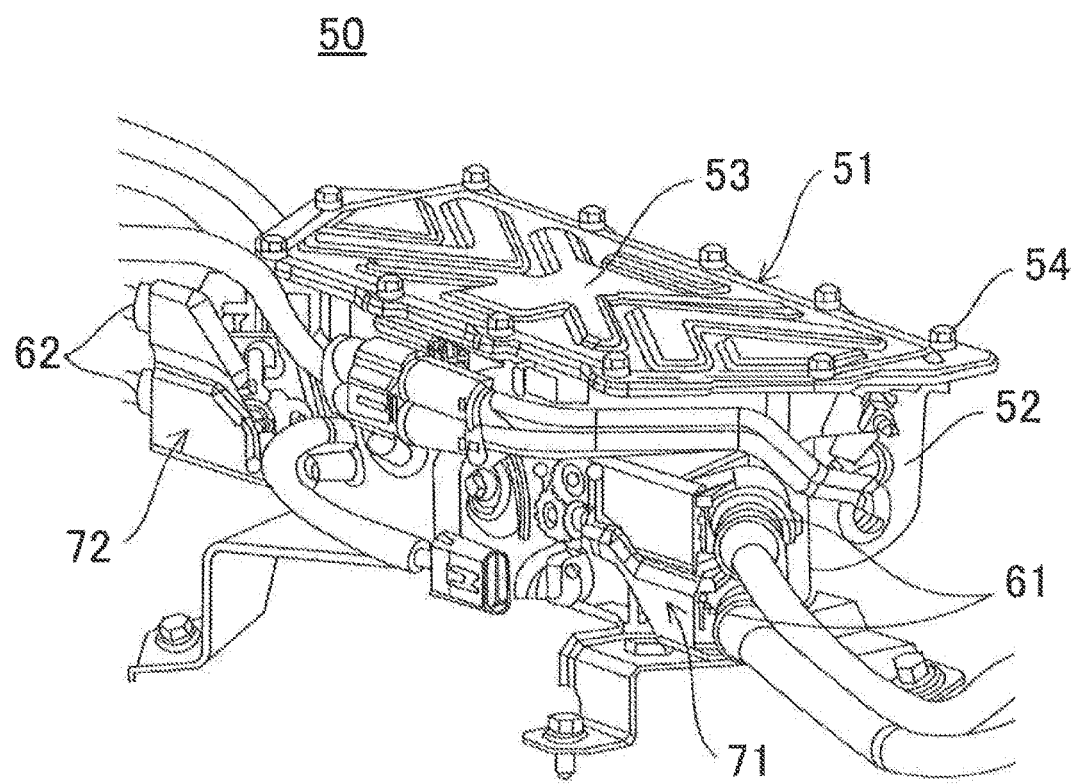
FIG. 2 is a perspective view of the external power supply unit including a connector cover structure according to the embodiment of the present invention.

Referring now to FIG. 2, an external power supply unit including a connector cover structure according to the embodiment of the present invention will be described. FIG. 2 is a perspective view of the external power supply unit including the connector cover structure according to the embodiment of the present invention. As illustrated in FIG. 2, the external power supply unit 50 includes a casing 51 that houses a high-voltage component. The casing 51 includes a casing body 52 as a container and a lid 53 hermetically sealing an upper opening of the casing body 52. The lid 53 has an irregular pentagonal shape in planer view, and is attached to the casing body 52 by screwing a plurality of bolts 54 in such a manner that the lid 53 can be opened and closed. The appearance of the casing 51 is not limited to the example illustrated in FIG. 2.

A direct current (DC)-side connector 61 and a power control unit (PCU)-side connector 62 for passage of high-voltage current are respectively disposed on both ends of the casing body 52. The connectors 61 and 62 receive and output high-voltage current, a side surface of the casing body 52 is provided with connector covers 71 and 72 covering lock portions 65 of the connectors 61 and 62, respectively. In this embodiment, the left and right connector covers 71 and 72 have different configurations. However, the present invention is not limited to this example, and the connector covers 71 and 72 may have the same configuration.

Figure 3:
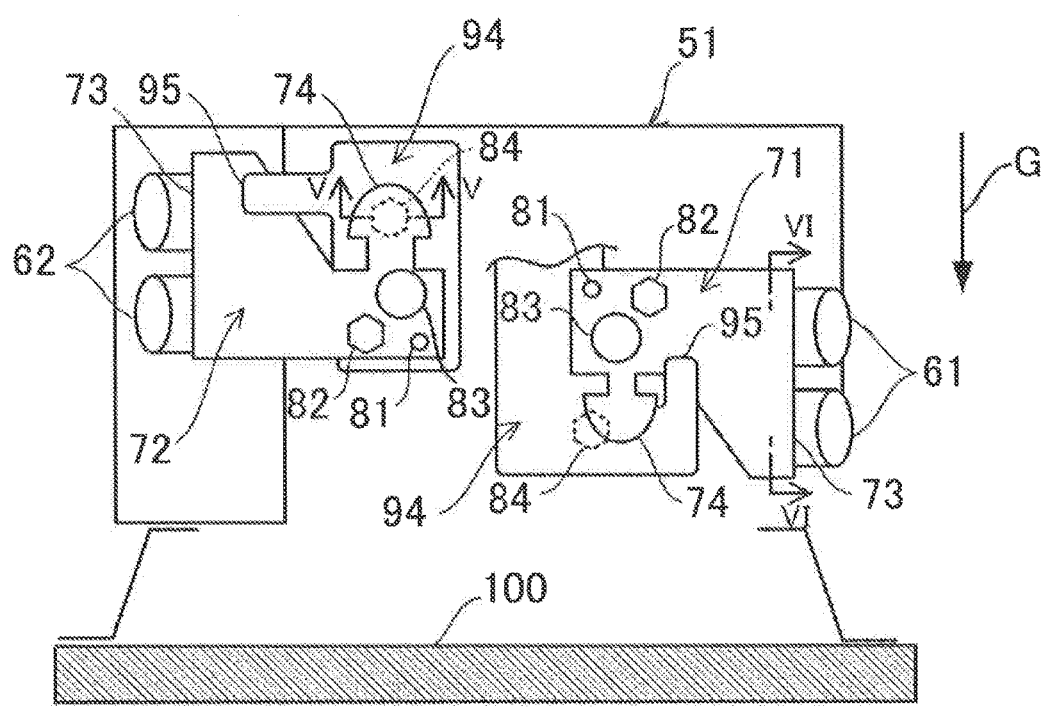
FIG. 3 schematically illustrates the connector cover structure according to the embodiment of the present invention.

Referring now to FIGS. 2 and 3, a connector cover structure included in the external power supply unit 50 according to the embodiment of the present invention will be described. FIG. 3 is a side view schematically illustrating the connector cover structure according to the embodiment of the present invention. As illustrated in FIGS. 2 and 3, the connector covers 71 and 72 are disposed in parallel to a plane along a vertical direction G of the casing 51 of the external power supply unit 50. Each of the connector covers 71 and 72 includes a pin 81, a bolt 82, and a striker 83.

The pin 81 is used for positioning the connector cover 71, 72 and a striker fixing bracket 94 described later. Each of the connector covers 71 and 72 includes a positioning-member insertion hole (pin insertion hole) 91 as a first anchoring part in order to insert the pin 81 as a positioning member therein (see FIG. 4). Each of the connector covers 71 and 72 also includes a fastening hole (fastening structure) 92 for fastening the bolt 82 therein (see FIG. 4) and is fixed to the casing 51 with the bolt 82 as a fastening member. Each of the connector covers 71 and 72 also includes a striker insertion hole 93 into which the striker 83 is inserted (see FIG. 4). The striker 83 can be detached by using a service plug of a hybrid (HV) battery (not shown). High voltage safety protection is ensured by detaching the striker 83 before detaching the connector covers 71 and 72.

As illustrated in FIG. 3, the DC-side connector 61 is disposed obliquely below the PCU-side connector 62. Since the DC-side connector 61 is disposed below the PCU-side connector 62, the distance between the DC-side connector 61 and a body 100 is small. In fastening the casing fixing bolt 82, working space for a tool needs to be kept between the casing fixing bolt 82 and the body 100. Thus, in the DC-side connector 61, the casing fixing bolt 82 is disposed above the striker 83.

Figure 4:
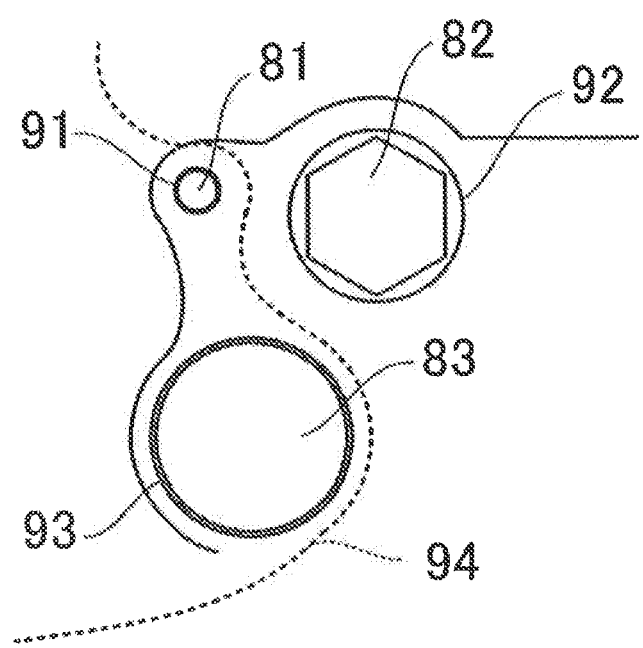
FIG. 4 schematically illustrates a positional relationship among a positioning pin, a casing fixing bolt, and a striker in the embodiment of the present invention.

Referring to FIG. 4, the positional relationship among the positioning pin 81, the casing fixing bolt 82, and the striker 83 will be described. FIG. 4 schematically illustrates a positional relationship among the positioning pin, the casing fixing bolt, and the striker in the embodiment of the present invention. As illustrated in FIG. 4, the striker 83 is fixed by the striker fixing bracket 94. The pin 81 is located closer to the striker fixing bracket 94 than the casing fixing bolt 82 is. Specifically, the positioning pin 81 penetrates the connector cover 71 or 72 and the striker fixing bracket 94, and is shared by the connector cover 71 or 72 and the striker fixing bracket 94. By sharing the pin 81, the accuracy of dimensions of the striker insertion hole 93 can be increased. In addition, since the pin 81 is located close to the striker fixing bracket 94, the mass can be reduced.

Figure 5:
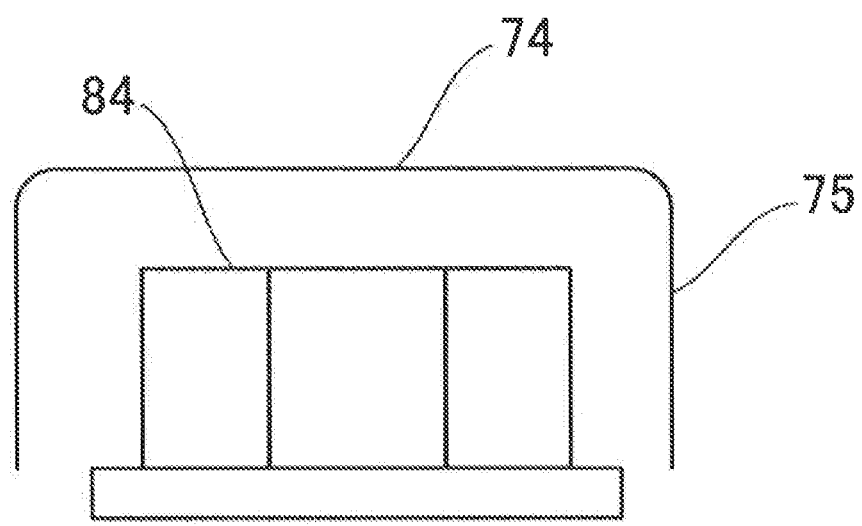
FIG. 5 is an arrow view taken along line V-V in FIG. 3.

Referring to FIGS. 3 and 5, the PCU-side connector cover 72 according to the embodiment will be described. FIG. 5 is an arrow view taken along line V-V in FIG. 3. As illustrated in FIG. 3, the PCU-side connector cover 72 includes a fastening-member concealing member (bolt concealing member) 74 as a second anchoring part. The bolt concealing member 74 is semicircular in front view, for example, but is not limited to the illustrated shape. As illustrated in FIG. 5, the bolt concealing member 74 has a channel shape in cross section, but is not limited to the illustrated shape. The bolt concealing member 74 includes a flange 75 that conceals surroundings of a fastening member (bolt) 84 for fixing the striker fixing bracket 94 to the casing 51. In addition, the bolt concealing members 74 are configured in such a manner that the connector cover 71, 72 and the striker fixing brackets 94 are detached at the same time without detaching the strikers 83, thereby preventing a failure in ensuring high voltage safety protection.

Referring to FIG. 3 again, each the connector covers 71 and 72 includes a float preventing mechanism 95 for preventing the connector cover 71 or 72 from floating. The float preventing mechanism 95 is a tongue-shaped extension provided in part of the striker fixing bracket 94, and presses a surface of the connector cover 71 or 72. As shown in FIG. 3, the float preventing mechanism 95 forms a holding structure of the bracket 94 that extends from the bracket 94 and presses against the surface of the connector cover 71 or 72 on a side of the connector cover 71 or 72 opposite from a side of the connector cover 71 or 72 facing the casing 51 so as to hold the surface of the connector cover. The float preventing mechanism 95 prevents the connector cover 71 or 72 from being displaced from the pin 81 and falling down. That is, the float preventing mechanism 95 prevents the connector cover 71 or 72 from hitting on the float preventing mechanism 95 and falling down, thereby eliminating the necessity of fastening the bolt 82 with the connector cover 71 or 72 being supported with a finger in assembling the connector cover 71 or 72.

Figure 6:
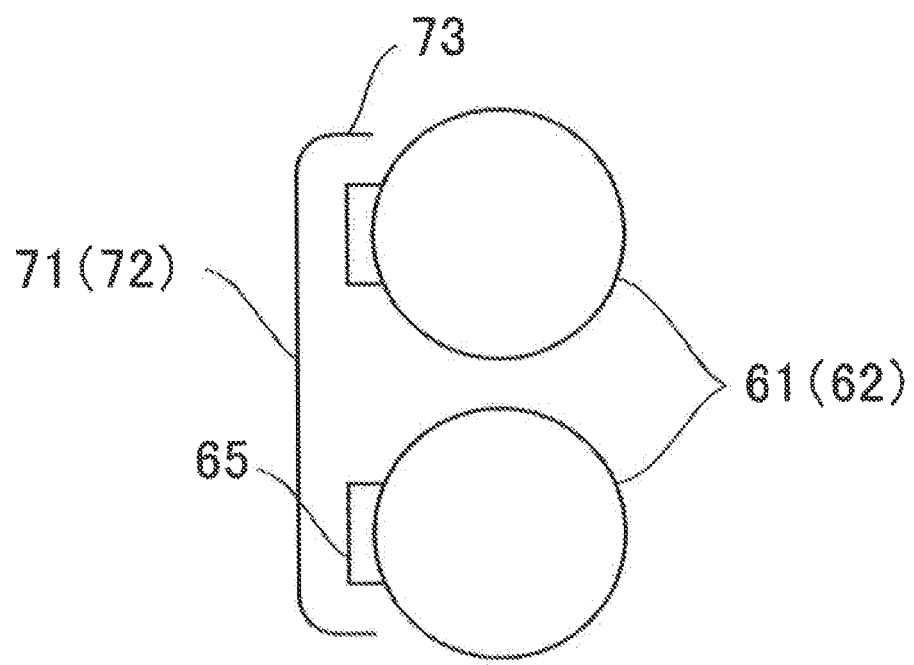
FIG. 6 is an arrow view taken along line VI-VI in FIG. 3.

Then, referring to FIG. 6, the flange 73 of each of the connector covers 71 and 72 will be described. FIG. 6 is an arrow view taken along line VI-VI in FIG. 3. As illustrated in FIG. 6, each of the connector covers 71 and 72 includes the flange 73 whose both edges are bent in order to increase the rigidity of the connector cover 71 or 72. In the connector cover 71 or 72, the flange 73 of the connector cover 71 or 72 covers the lock portion 65 of the connector 61 or 62. When the flange 73 of the connector cover 71 or 72 hits the connector 61 or 62, rotation of the connector cover 71 or 72 around the axis of the pin 81 can be prevented.

Then, referring to FIGS. 1 to 6, advantages of the connector cover structure according to the present invention will be described. As illustrated in FIGS. 1 and 2, electric power generated by the fuel cell stack 20 of the fuel cell vehicle 100 is supplied to an external device through the external power supply unit 50. The casing 51 of the external power supply unit 50 houses a high-voltage component. The DC-side connector 61 and the PCU-side connector 62 for passage of high-voltage current are respectively disposed on both ends of the casing body 52, and the lock portions 65 of the connectors 61 and 62 are covered with the connector covers 71 and 72 (see FIG. 6).

Each of the connector covers 71 and 72 includes the pin insertion hole 91 as the first anchoring part and the bolt concealing member 74 as the second anchoring part. First, the positioning pin 81 of each of the connector covers 71 and 72 is inserted into the pin insertion hole 91 as the first anchoring part. The flange 75 of the bolt concealing member 74 as the second anchoring part conceals surroundings of the bolt 84 for fixing the striker fixing bracket 94 to the casing 50.

As illustrated in FIGS. 3 and 4, in the configuration of the DC-side connector cover 71, the bolt concealing member 74 can reduce rotation around the pin insertion hole 91. That is, the flange 75 of the bolt concealing member 74 hits the casing fixing bolt 84, thereby preventing rotation of the DC-side connector cover 71 around the axis of the pin 81 in assembly. On the other hand, in the configuration of the PCU-side connector cover 72, the pin insertion hole 91 can reduce rotation around the bolt concealing member 74.

The connector covers 71 and 72 include the float preventing mechanisms 95 for preventing the connector covers 71 and 72 from floating. The float preventing mechanisms 95 press the surfaces of the connector covers 71 and 72. In the configuration of the DC-side connector cover 71, the float preventing mechanism 95 reduce rotation of the DC-side connector cover 71 in the pressing direction around the bolt concealing member 74. On the other hand, in the configuration of the PCU-side connector cover 72, the float preventing mechanism 95 suppresses rotation of the PCU-side connector cover 72 in the pressing direction around the pin insertion hole 91.

The float preventing mechanisms 95 prevent the connector covers 71 and 72 from displacing from the pins 81 and falling down. That is, the connector covers 71 and 72 hit the float preventing mechanisms 95 so that falling of the connector covers 71 and 72 is prevented. Thus, it is unnecessary to fasten the bolts 82 with the connector covers 71 and 72 being supported with fingers in assembling the connector covers 71 and 72. In addition, the float preventing mechanism 95 prevents the connectors 61 and 62 from reaching the lock portion 65 due to rattling of the striker 83 in detaching the casing fixing bolts 82.

As described above, in the connector cover structure according to the embodiment, rotation around of one of the pin insertion hole 91 as the first anchoring part or the bolt concealing member 74 as the second anchoring part can be reduced by the other anchoring part. In addition, the float preventing mechanism 95 can reduce rotation of the connector cover 71 or 72 in the pressing direction around one of the pin insertion hole 91 as the first anchoring part or the bolt concealing member 74 as the second anchoring part. Thus, it is possible to obtain significant advantages in which the connector cover can be fastened without support for the connector cover with a finger, and the connector cover structure has a high degree of assembly of the connector covers 71 and 72 in fabrication.

Other Embodiments

The foregoing references are made to the embodiment of the present invention with reference to the description and the drawings which form a part of the disclosure but should not be construed as limiting the invention. Various alternative embodiments, examples, and techniques of application will become apparent to those skilled in the art from the disclosure. For example, in the embodiment described above, the DC-side connector cover 71 and the PCU-side connector cover 72 have different configurations. However, the present invention is not limited to this example, and the structures of the left and right connector covers may be shared as the configuration of the connector cover 71 or the connector cover 72. In this manner, it should be understood that various embodiments and others are included in the present invention.

DESCRIPTION OF REFERENCE SIGNS 20 fuel cell
50 external power supply unit
74 second anchoring part
91 first anchoring part
92 fastening hole
95 bolt concealing member

What is claimed is:
1. A connector cover structure that is provided in a casing housing a high-voltage component in a vehicle and that covers a connector for passage of high-voltage current, the connector cover structure comprising:
   a bracket;
   a connector cover that engages with the bracket; and
   a fastening structure that fastens the connector cover to the casing through the bracket,
   wherein the bracket has a holding structure that extends from the bracket so as to press against a surface of the connector cover on a side of the connector cover opposite from a side of the connector cover facing the casing so as to hold the surface of the connector cover.
2. The connector cover structure of claim 1, wherein the fastening structure has:
   an insert hole that is arranged in the bracket; and
   a fastening member, which is arranged on the connector cover, that fastens the connector cover to the casing through the insert hole of the bracket.

* * * * *